(12) United States Patent
Iiyama et al.

(10) Patent No.: US 6,281,462 B1
(45) Date of Patent: Aug. 28, 2001

(54) BURR PROCESSING APPARATUS

(76) Inventors: Saburo Iiyama, 719-215, Hajika-cho, Asikaga-shi, Tochigi-ken 326-0143 (JP); Kazuomi Kusumoto, 7-50, Miyamoto-cho 4-chome, Kiryu-shi, Gunma-ken 376-0056 (JP)

( * ) Notice: Subject to any disclaimer, the term of this patent is extended or adjusted under 35 U.S.C. 154(b) by 0 days.

(21) Appl. No.: 09/418,431

(22) Filed: Oct. 15, 1999

(30) Foreign Application Priority Data

Oct. 21, 1998 (JP) .................................................. 10-318380
Aug. 11, 1999 (JP) .................................................. 11-228012
Sep. 30, 1999 (JP) .................................................. 11-280054

(51) Int. Cl.⁷ ................................................ B23K 9/013
(52) U.S. Cl. .......................................... 219/69.1; 219/136
(58) Field of Search ............................. 219/69.1, 69.11, 219/69.17, 123, 136, 138

(56) References Cited

U.S. PATENT DOCUMENTS

| | | | |
|---|---|---|---|
| 2,809,277 | * 10/1957 | Breymeier | 219/123 |
| 3,231,430 | * 1/1966 | Krieger et al. | 219/69.1 |
| 3,937,915 | 2/1976 | Matsuo et al. | |
| 4,308,446 | * 12/1981 | Okane et al. | 219/123 |
| 5,473,131 | 12/1995 | Sperling | |
| 6,118,094 | * 9/2000 | Hoy | 219/69.1 |

FOREIGN PATENT DOCUMENTS

| | | | |
|---|---|---|---|
| 50-28093 | 3/1975 | (JP) | |
| 55-30386 | * 3/1980 | (JP) | 219/123 |
| 7-40150 | 2/1995 | (JP) | |
| 8-132392 | 5/1996 | (JP) | |
| 10249470 | 9/1998 | (JP) | |

* cited by examiner

*Primary Examiner*—Clifford C. Shaw
(74) *Attorney, Agent, or Firm*—Andrew C. Aitken; Venable Baetjer; Howard & Civiletti LLP (57) ABSTRACT

There is developed a burr processing apparatus in which a discharge electrode is moved along a peripheral edge of the processed material, the burr is processed in an entire uniform manner and concurrently the arc discharge is performed stably and a long life of the electrode is attained.

The burr processing apparatus of the present invention is made such that the discharge electrode 20 is formed into a cylindrical shape having a sectional shape gradually narrowed toward the extremity end and having a specified width in a lateral direction, the discharge electrode 20 is kept at a height suitable for the arc discharge, the case 30 is arranged to cover the electrode, the handle 40 is connected to the case 30 to be moved manually and a power supply for the arc discharging is connected to the discharge electrode 20.

2 Claims, 9 Drawing Sheets

BURR PROCESSING APPARATUS

DETAILED DESCRIPTION OF THE INVENTION

1. Technical Field of the Invention

This invention relates to a burr processing apparatus which is suitable for removing a generated burr and making it flate when an iron plate, a stainless steel plate and an aluminum plate are cut under application of an arc discharge.

2. Related Art

Figure 9A:
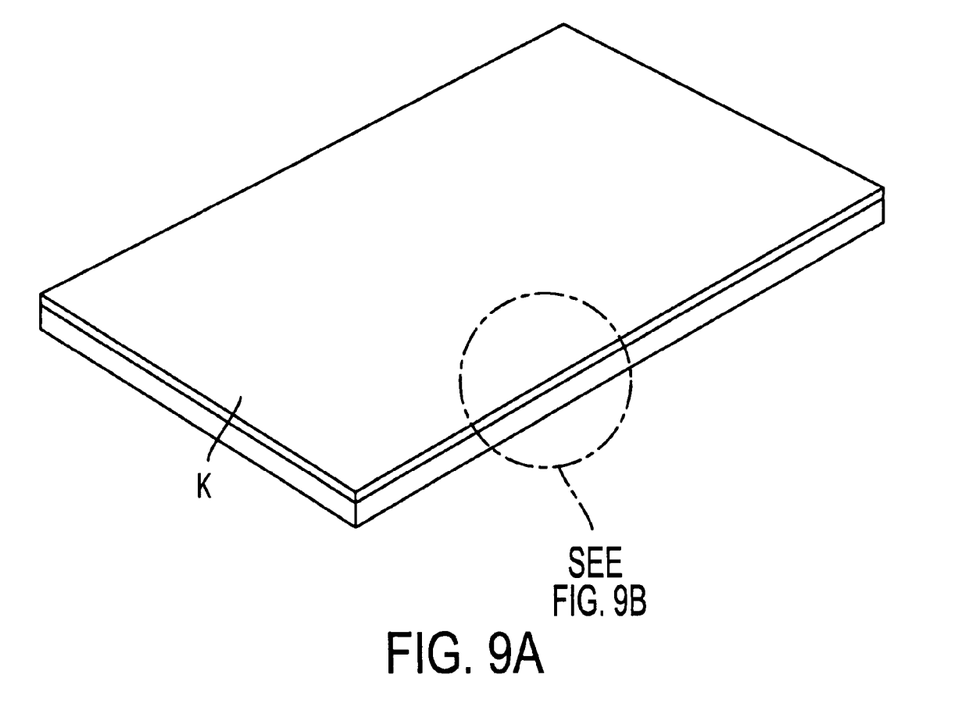
FIG. 9a is a perspective view for showing a state in which the burr is generated at the processed material.
Figure 9B:
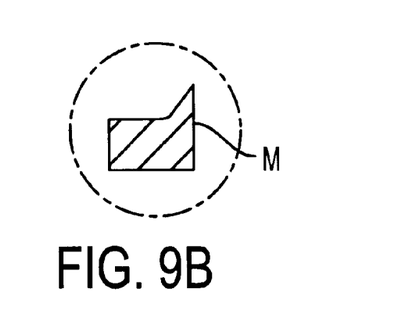

As shown in FIG. 9, when an iron or steel material, a stainless steel and an aluminum plate or the like are press cut, many burrs are usually generated at a peripheral edge of the metallic plate. In order to process these burrs, it is known to apply (a) a method for processing them with an automatic burr removing machine in which a processed member is dived in a system having a grinding machine therein to remove burrs; (b) a method for processing them manually with a hand grinding machine; and (c) a buff applying method blowing fine grinding particles against the burr to remove it and the like. However, these means had some problems, i.e. (a) in case of an automatic burr removing machine, not only the burr but also the product portion is damaged and at the same time there is a certain limitation that the processed material must be a flat plate, (b) in case of a grinder, there occurs a problem of producing return-burr and its operation is not efficiently carried out and further (c) the buff applying operation also easily produces scar at the product.

In turn, as a burr removing apparatus performed under utilization of plasma discharging operation, for example, apparatuses disclosed in (a) the gazette of Japanese Patent Laid-Open No.Sho 50-28093, (b) the gazette of Japanese Patent Laid-Open No.Hei 7-40150 and (c) the gazette of Japanese Patent Laid-Open No.Hei 8-132392 are well known in the art.

Their gists consist in (a) an arrangement that there are provided a sealingly closed vacuum processing container, a pump device for evacuating the container, a moving device for passing and moving the processed wires into a processing container discharged by the pump device, and an electrical discharging power supply for applying a discharge voltage between the moving wires so as to remove burrs and scales at the surface of the wires with a plasma striking action caused by the electrical discharge; (b) an arrangement that there are provided a transporting device for the processed material, electrodes arranged at both sides with the transporting device being held between them to perform a plasma discharge machine at a small diameter hole of the material, and a discharge point control means for moving the discharge point between the electrodes and discharging substantially over an entire region of the small diameter hole of the machine material and (c) a method for machining a through-hole punched at the processed base material, wherein after passing through the through-hole, the drill or a router being applied as one electrode, a voltage is applied between the drill or router electrode and the electrode at the processed base material and at the same time, a corona discharge is generated between both electrodes with an air pressure of 10 to $2 \times 10^3$ Torr.

In view of the foregoing, if it is assumed that the burr is processed under application of the plasma discharge against the aforesaid iron and steel material, the aforesaid methods (a) to (c) are applied to the iron and steel material and the like, only a partial burr at the small diameter hole near the electrode is processed due to the form in which device itself is fixed and the processed material is moved, resulting in that as for the object material such as the iron and steel material having a long burr to be processed and its shape or size is not specified, it is impossible to perform a uniform processing over the entire material.

SUMMARY OF THE INVENTION

In view of the foregoing, the present inventor noticed to perform an operation in which the apparatus itself, i.e. the discharge electrodes are moved along the peripheral edge of the processed material so as to perform an entire uniform processing of the burr.

However, it has become apparent that if the discharge electrodes are moved as they are, they show some disadvantages that the discharge electrodes are moved in a zig-zag form on a line where the burrs are generated, and a clearance between the burr and the electrode is unstabled, resulting in that the electrodes approach much closer at a certain location and remove excessive amount of burr, and in turn at another certain location, the electrodes are away too much to remove the burrs. It has also become apparent to generate a problem that when the electrodes are moved, an electrical discharge time becomes elongated as the moving distance is extended, resulting in that if acute electrodes are applied, their extremity ends are damaged and so the electrodes must be frequently replaced with new electrodes.

The present invention has been invented in order to solve these problems.

The burr processing apparatus of the present invention is constituted such that an electrical discharge electrode is formed into a cylindrical shape having a sectional shape being narrowed toward its extremity end and having a specified width in a lateral direction, said electrical discharge electrode is kept at such a height as one suitable for an arc-discharge, a case member is arranged to cover said electrode, a handle connected to said case member and manually moved and then a power supply for an arc discharge is connected to said discharge electrode.

It is preferable that the electrical discharge electrodes are of a chisel-shaped discharge electrode having a cylindrical extremity end with a sectional shape narrowed toward an extremity end and with a specified width in a lateral direction, a hold section which is cylindrical or elliptical shape in a longitudinal direction and a raised part at an intermediate section.

When electrical discharge electrodes set at a specified height of the case are oppositely faced against the burr generating locations of the processed materials and the power supply for them is turned on, an arc discharge is released from the discharge electrodes and the acute burrs are melted and removed by inputted heat.

At this time, the handle is held by a hand and the bottom side of the case is moved along the peripheral edge where the burr of the processed material is generated, the arc discharge from the discharge electrodes is carried out continuously toward the burr and since the most suitable point within the width of the cylindrical electrode having a specified width in a lateral direction is selected automatically, the discharge point from the power supply is dispersed within a specified width, resulting in that a stable electrical discharge is attained.

Further, since a moving speed and a moving stage can be changed in response to a size and a form of burr, a wide correspondence against the situation may become possible.

In the case that the electrical discharge electrodes are of a chisel shape, a certain pressure change is generated in a gas flow flowing between the case and the intermediate raised part to cause an annular eddy flow to be induced near the extremity ends of the electrodes, a high shielding effect is generated by the annular eddy flow, heat of the electrodes is absorbed and then a shield effect as well as a cooling effect are increased.

The apparatus of the present invention having the aforesaid configuration and action has some superior effects that it enables a burr having a relative long distance and non-uniform shape generated at iron and steel material, stainless steel and aluminum plate or the like to be processed in an entire uniform manner and at the same time the operation can be carried out in a quite high efficient manner. Further, since the apparatus has a less amount of wear at the electrode, it has a long life as the product and this invention is an advantageous invention having some practical and economical values.

BRIEF DESCRIPTION OF THE DRAWINGS

FIG. 9b is an enlarged sectional view of a portion of 9a.

DESCRIPTION OF THE PREFERRED ENBODIMENTS

The apparatus of the present invention requires a power supply 10 enabling an arc discharge, and as this power supply, a power supply applied in the existing arc welding operation can be utilized.

One example of the power supply used for an arc welding operation will be described as follows, wherein an inverter-controlled supplying device is operated to convert an alternating current of commercial frequency into a direct current through a rectifier, convert it into a high frequency alternating voltage by an inverter having switching elements such as transistors and the like, apply it to a transformer, decrease it to a voltage suitable for processing burrs by this transformer, thereafter rectify it again and output a direct current having flat wave through a direct current reactance. This power supply is not limited to an inverter type, but a thyristor type, a movable iron core type, a slide transformer type and a transistor chopper type can be utilized.

Subsequently, wirings are connected to the power supply 10, one of the wirings is provided with a discharge electrode 20 for discharging an arc toward the burr M, and the other wiring is provided with a contact point 11 connected to the processed material K of the present invention for receiving electrical discharge and applying an earth to the cathode, so as to form an arc discharge circuit against the processed material K.

As an electrode arrangement of the aforesaid electrodes, there are one case in which the electrode is perpendicular to a shield gas supplying direction and the other case in which the electrode is set in the same direction as a shield gas supplying direction from each other, although if the electrode shape is of a chisel shape, their directions are set to be the same to each other.

A reason why this operation is carried out consists in attaining a situation in which a shield effect at the electrical discharge section and a cooling effect are increased in such a manner that a shield gas supplying direction and an electrode arranging direction are set to be the same from each other and the electrodes are enclosed and covered with a shield gas from the holding part having the electrode fixed to the extremity end where an electrical discharge is produced.

Then, an arc discharge is carried out stably under atmosphere of inert gas such as argon gas and the like against the discharge electrode 20 while this discharge electrode being covered with it and there is formed a case 30 for keeping the discharge electrode 20 and the burr M at a specified distance.

Figure 1:
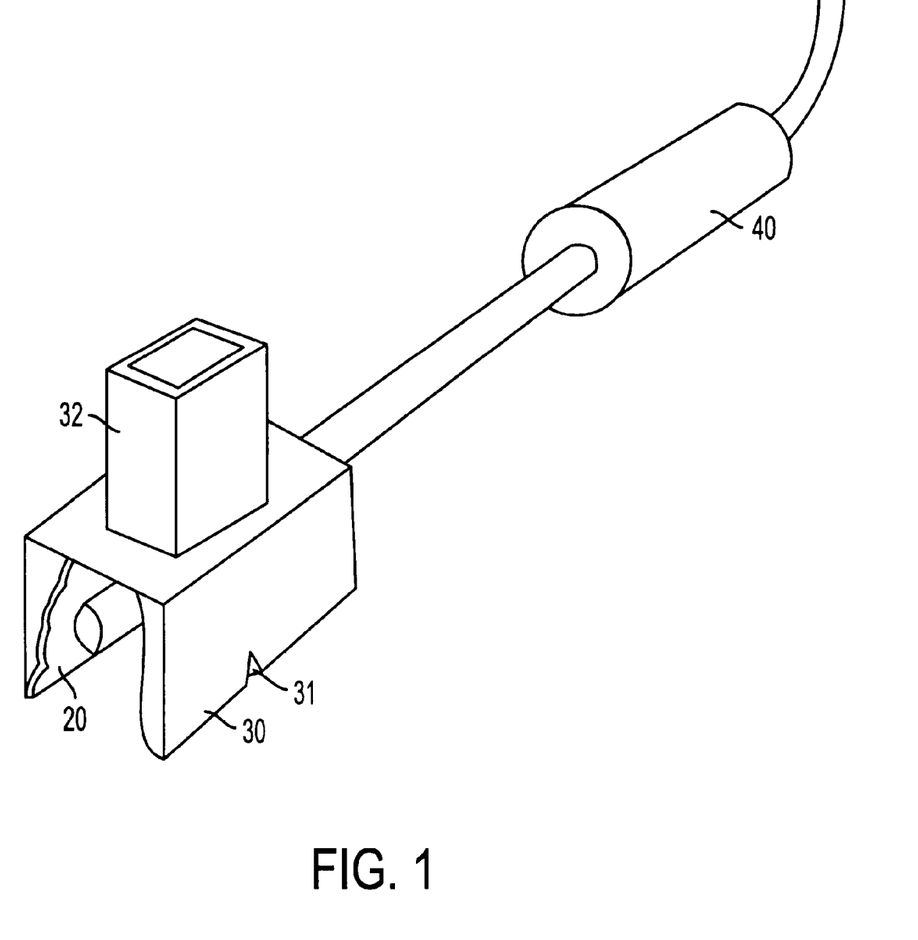
FIG. 1 is a perspective view for showing a substantial part of the apparatus of the present invention.
Figure 2:
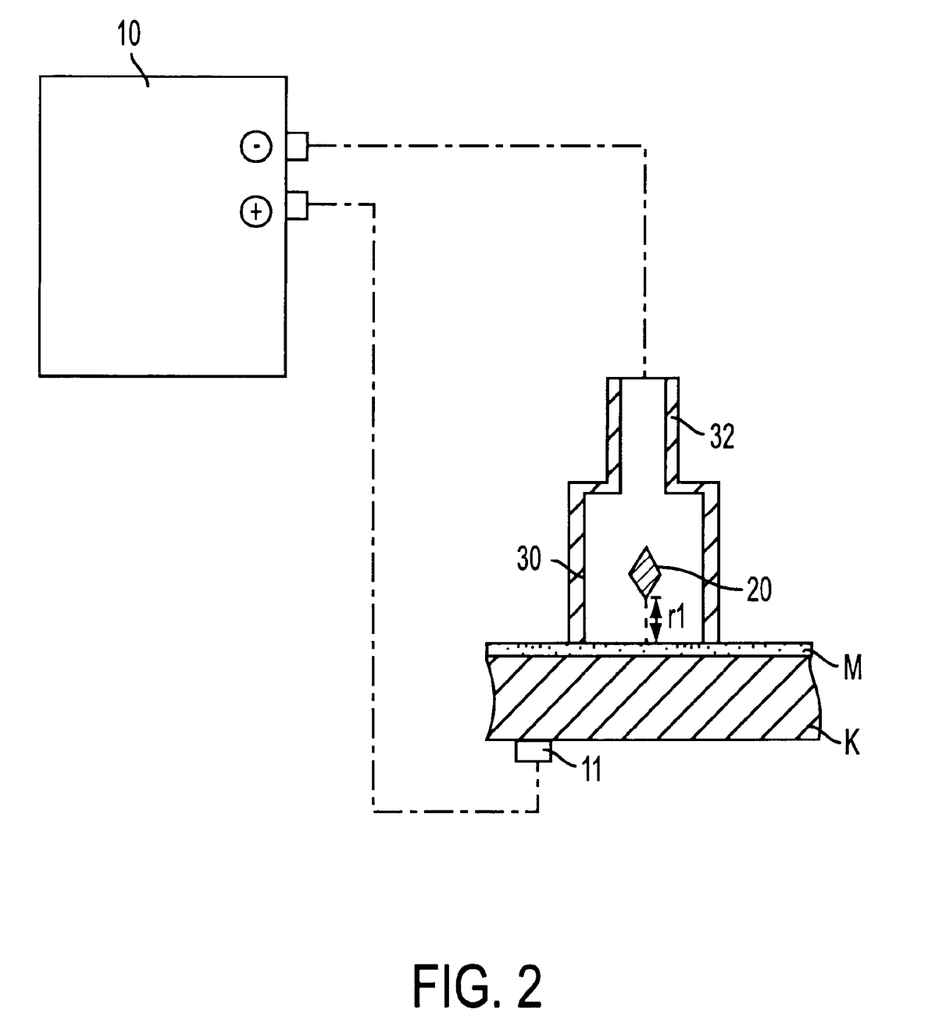
FIG. 2 is a front elevational view for showing an entire apparatus of the present invention.

As shown in FIG. 2, a distance r1 (height) between the discharge electrode 20 and the bottom side of the case 30 is operated to keep a fixed distance when a suitable distance for removing the burr under an arc discharge operation is set and the bottom side is run along the peripheral edge where the burr is generated.

Figure 5:
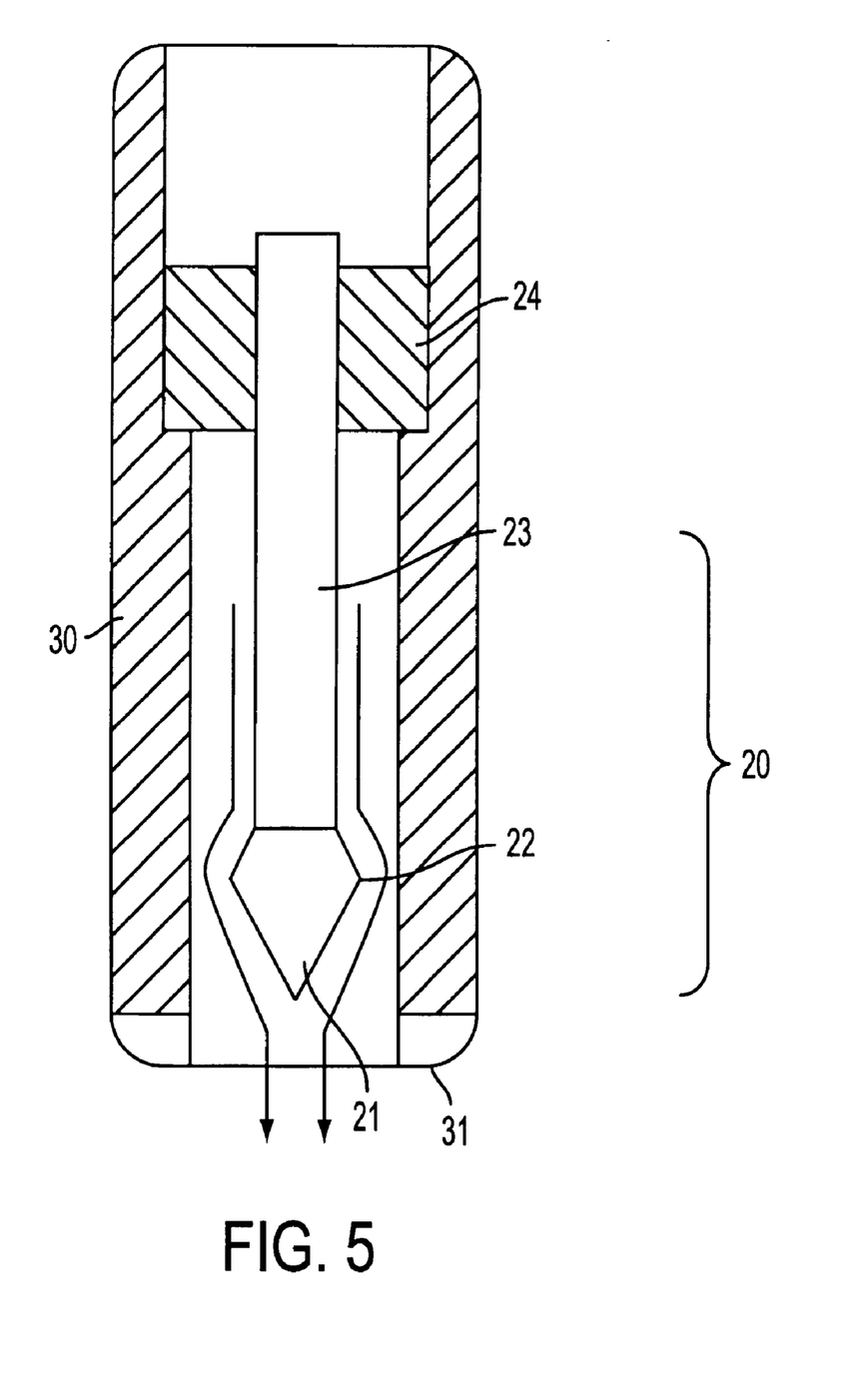
FIG. 5 is a front elevational view with a part being in section for showing a state in which the discharge electrode is of a chisel type and a cylindrical case is covered on it.
Figure 6:
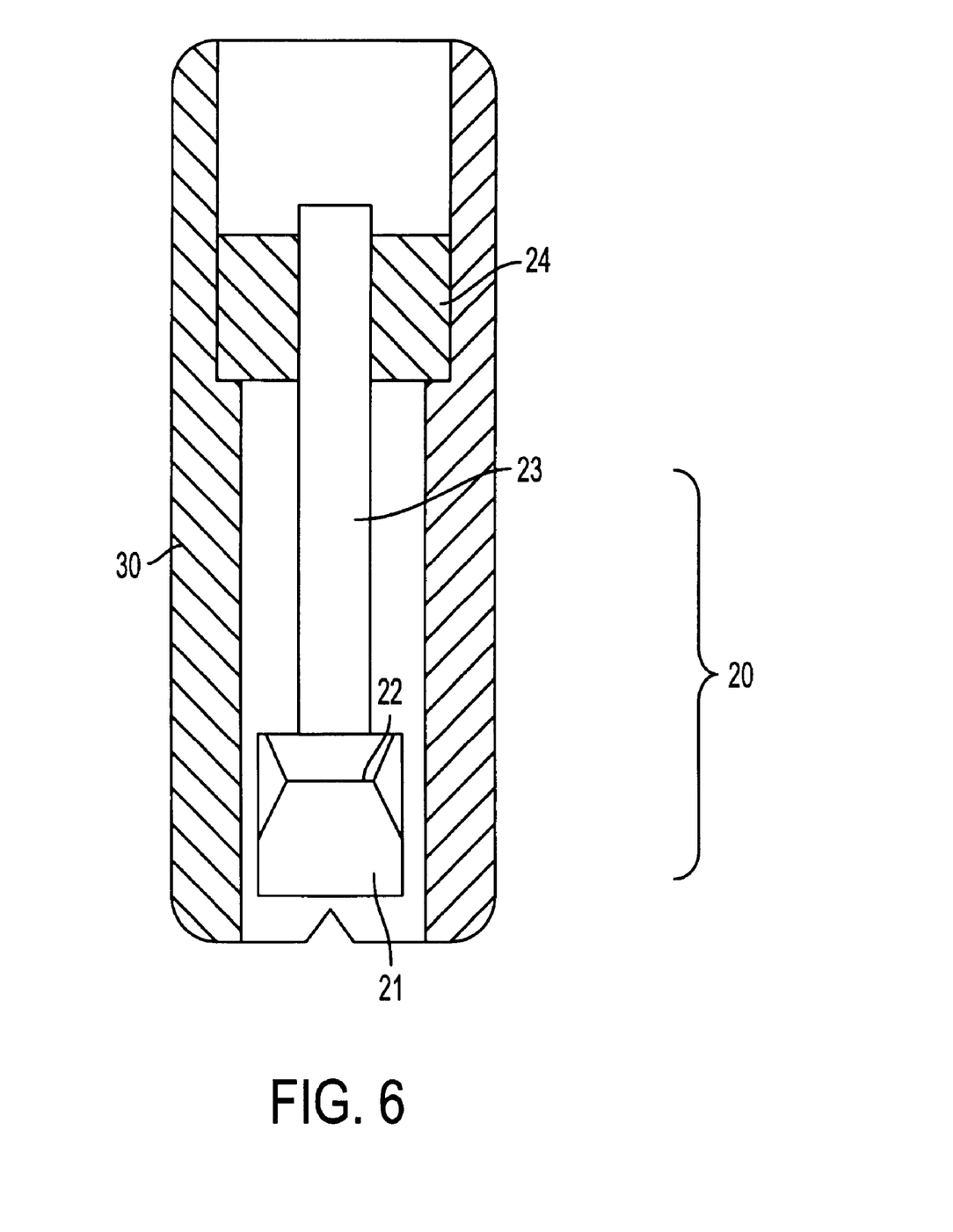
FIG. 6 is a side elevational view with a part being in section for showing a state in which the discharge electrode is of a chisel type and a cylindrical case is covered on it.
Figure 7:
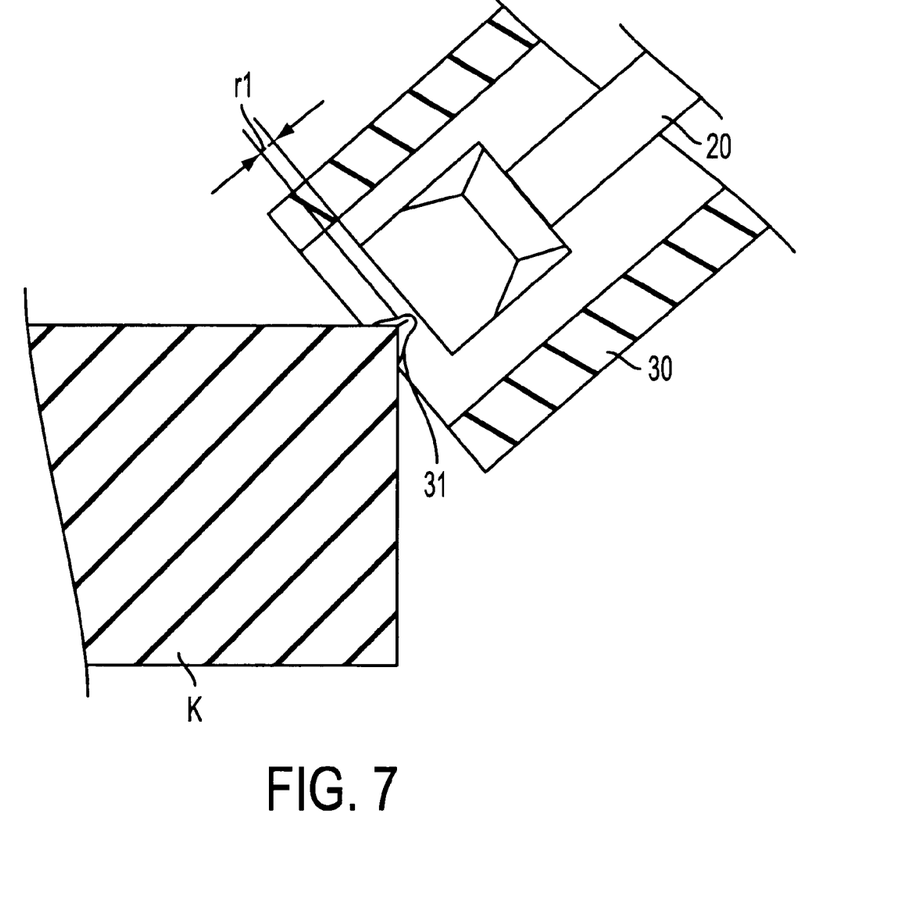
FIG. 7 is a cross-sectional view with a part being broken away to show a state in which a case formed with a guiding groove is abutted against the processed material.
Figure 8A:
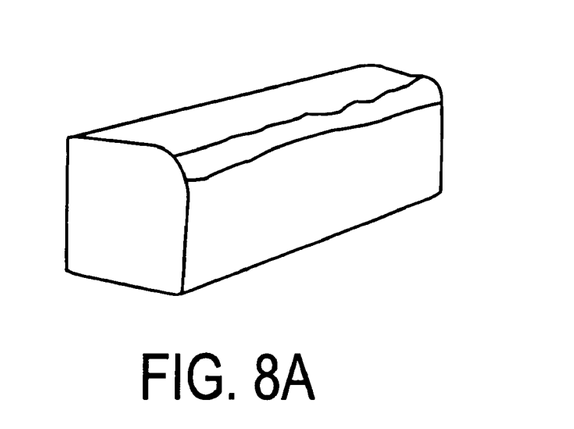
FIGS. 8A and 8B is a perspective view and a cross-sectional view, respectively, for showing a case in which the processed material is processed under a condition of the preferred Embodiment 2, in which current of 40 A was applied.
Figure 8B:
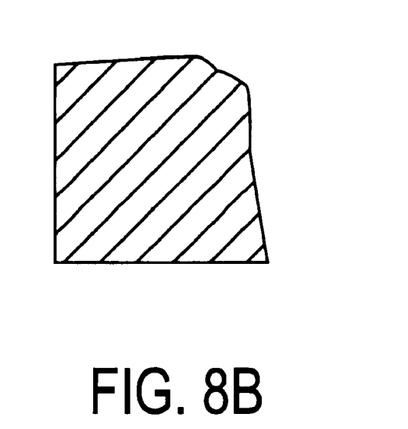
Figure 8C:
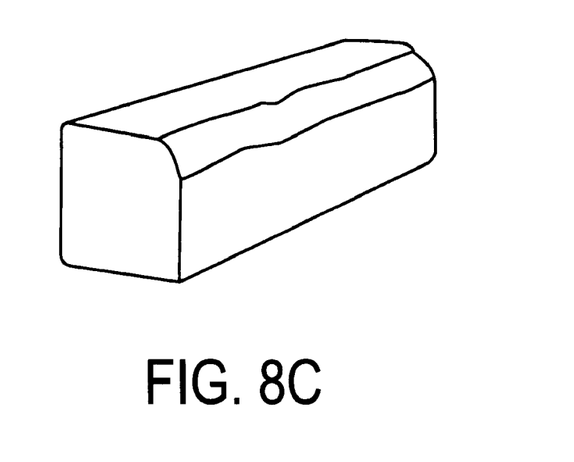
FIGS. 8C and 8D are a perspective view and a cross-sectional view, respectively, for showing a case in which the processed material is processed under a condition of the preferred Embodiment 2, in which current of 50 A was applied.
Figure 8D:
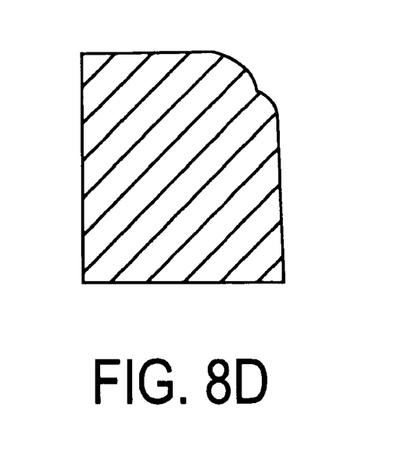

As means for keeping this distance constant, a V-shaped guiding groove 31 is formed at the bottom surface of the case which is perpendicular to a direction of the processed material where the burr is generated, as shown in FIGS. 5, 6 and 7, and it is possible to employ means for moving the groove 31 while it is being lightly abutted against the edge of the processed material. It is preferable that the corner part of the guiding groove 31 has a small hole to make its smooth contact with the burr. However, its size is set such that a shield effect may not be lost.

With such an arrangement as above, an inter-electrode distance can be kept constant, a torch angle is also kept constant, resulting in that a machining processing having a stable quality can be attained.

In these figures, reference numeral 32 denotes a gas port for use in blowing argon, helium, nitrogen and mixture gas for shielding operation.

It is satisfactory that a shape of this case 30 is one in which the electrode can be shielded. However, in the case that the electrode to be described later is of a chisel type, it is preferable that the shape of the electrode is formed into a cylindrical shape or an elliptical cylinder shape along the electrode.

A reason why this arrangement is provided consists in the fact that not only a consumption of the electrode is restricted, but also an oxidization of the processed section is limited to prevent a seizure or a decolorization of it by considering that the arc discharge shows an axial symmetrical form and by improving the shielding effect and the cooling effect.

There is provided a handle 40 for use in holding the case 30 and for moving the discharge electrode 20 manually along a peripheral edge of the processed material.

Although it is preferable that material quality of the handle 40 is an insulating material such as bakelite or the like, its shape and size or the like are properly set in compliance with a shape and a size of the processed material.

Then, the most important thing consists in the fact that the discharge electrode 20 must not be a needle-like electrode or a rod-like electrode with its extremity end being acute in shape, but a fine extremity end body with its entire body being narrowed toward its extremity end at a section in a right-angled crossing direction and a cylindrical electrode having a specified width in a lateral direction against a peripheral edge where the burr M is generated.

Figure 4A:
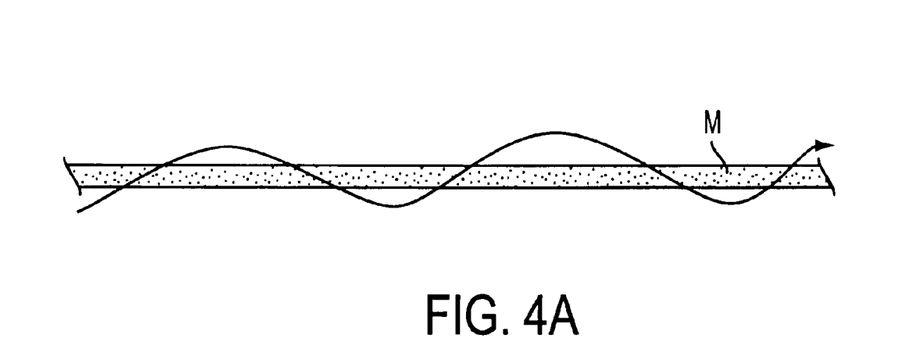
FIGS. 4A and 4B are schematic top plan view for showing a state in which the conductive electrode is moved over the burr, wherein 4A shows a case in which the needle-like electrode is moved; and 4B shows a case in which the electrode of the present invention is moved.
Figure 4B:
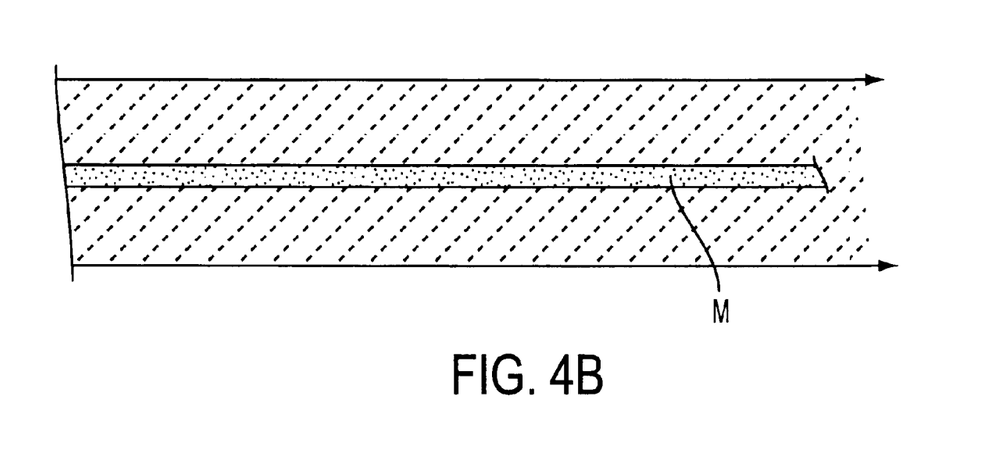

Because in case of the prior art needle-like electrode or the rod-like electrode with its extremity end being acute, as shown in FIG. 4A, the extremity end of the electrode is in a zig-zag form when the electrode is moved manually against the peripheral edge where the burr M is generated, resulting in that a stable electrical discharge can not be attained and so this disadvantage is to be eliminated.

Figure 3A:
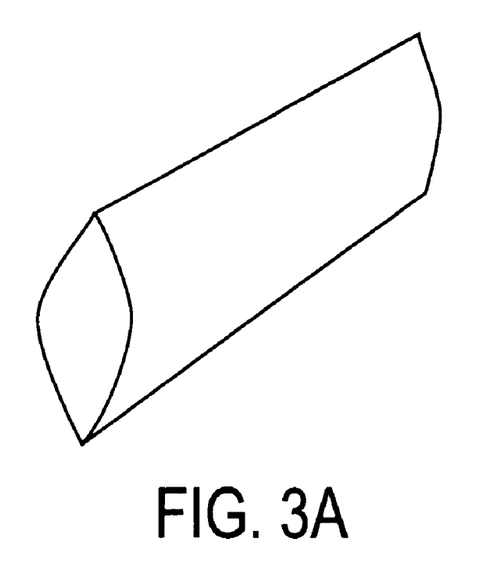
FIGS. 3A and 3B are perspective view for showing each of the preferred embodiments of the discharge electrode.
Figure 3B:
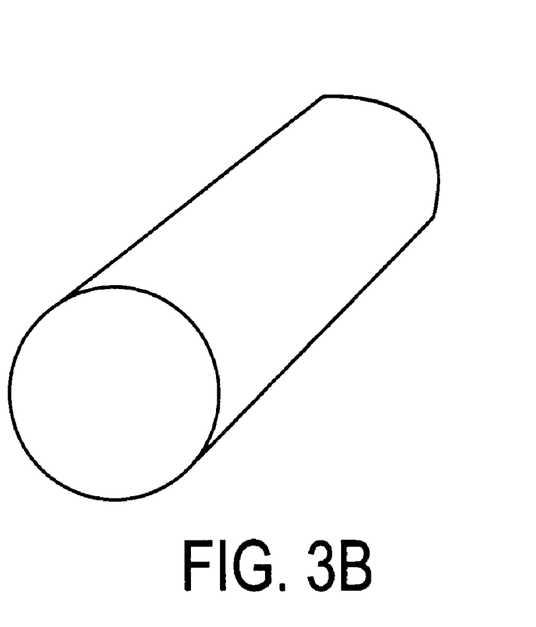

A cylindrical shape of which section is gradually narrowed toward its extremity end and having a specified width in a lateral direction is meant by a longitudinal wing section (FIG. 3A) or a circular shape (FIG. 3B) and although not shown, it may widely include a triangular shape, a rhomb and an ellipse or the like. The lateral direction in this case is defined as a direction perpendicular to an extending direction of the peripheral edge of the processed material where the burr M is generated.

In addition, as shown in FIGS. 5 and 6, it is preferable that the shape of the electrode is set as a chisel type electrode in which a lateral direction of the extremity end 21 is made to be relatively short, its upper part is made as a cylindrical or elliptical cylindrical holding section 23 enclosed by a collet 24 and its intermediate section is formed with a raised section 22 comprised of a front slant surface 22a and a rear slant surface 22c with a top end 22b being held between these surfaces, and then a certain pressure difference is produced in a gas flow flowing the electrode and the case 30.

Because, an appropriate setting of the width of the extremity end in the lateral direction causes an unstability of the arc discharge to be put down, resulting in that an arc is stabilized. Further, a reason why the intermediate raised section 22 is formed consists in producing a pressure change in the gas flow flowing between the case 30 and the raised section 22, generating an annular eddy flow so as to improve an effect of shielding of gas and an effect of cooling operation.

Then, an action of the present invention will be described as follows. The processed material K to be treated in accordance with the present invention is metallic products such as iron and steel, stainless steel, aluminum or copper, or relative superior conductive raw material such as a conductive plastic material.

Then, the power supply 10 for the arc discharge is prepared and as this power supply, the power supply used for performing an arc welding can also be used as it is, as described above, although if an existing power supply is not present, an exclusive power supply may also be used.

Then, a pole communicated from a cathode side of the power supply 10 with the discharge electrode 20 is connected to the processed material K where the burr M is generated by a press cutting operation for the aforesaid raw material, and in turn a contact point 11 such as a jack or the like is connected to the pole communicated with the anode side and the proper location near the burr generating part of the processed material K is held by the jack. The poles may be reversed according to the certain materials.

Then, as shown in FIG. 2, the discharge electrode 20 set at a specified height r1 of the case 30 is faced against the burr generating location of the processed material K, resulting in that if the switch for the power supply 10 is turned on, an arc discharge is released from the discharge electrode 20 and the arc is discharged to a conductor having an acute angle at the shortest distance, i.e. the extremity end of the burr.

Then, an inputted heat generated by an electrical power inputted by this arc discharge is expressed by $$Q = I \times V/v,$$

where,
Q: inputted heat
I: arc current
V: arc voltage
v: moving speed and the acute burr is melted and removed by the inputted heat.

At this time, the handle 40 is held and then the bottom side of the case 30 is moved along the peripheral edge where the burr M of the processed material K is generated.

Then, the arc discharge from the discharge electrode 20 is carried out continuously toward the burr M and during this operation, a point electrically discharged from the discharge electrode 20 becomes the location which is most near the extremity end of the burr M, resulting in that the shortest distance point within a specified width of the discharge electrode 20 having the specified width is automatically selected.

That is, the present situation shows that the extremity end of the burr is not necessarily in a linear form, but as seen from its top plan view, it is corrugated in a random manner, this is accommodated within a specified range and so a unstabled discharge does not occur.

Further, a random corrugation may promote a dispersion of the discharge point and cause a life of the discharge electrode 20 to be extended. That is, when a continuous discharge is carried out from a certain point of the acute discharge electrode, its extremity end may easily be damaged. However, since the shape of the electrode in the present invention has a certain specified width as described above and the discharge point is moved, it is possible to avoid a promotion of damage at the material caused by a concentration at one point.

Further, during motion of it, the bottom side of the case 30 is moved along the peripheral edge of the burr, so that the height r1 of the discharge electrode 20 is kept at a substantial constant value and the arc voltage becomes stable.

At that time, if the bottom surface of the case is formed with a V-shaped guiding groove 31 and the guiding groove 31 is moved while it is lightly abutted against the edge of the processed material, a distance between the electrodes can be kept constant and concurrently a torch angle is also kept constant, resulting in that it may contribute to a stabilized quality.

As apparent from the aforesaid expression of inputted heat, its moving speed may influence substantially on a heating calory to be applied, so that the moving speed is adjusted manually in reference to a size and form of the burr M. For example, if the burr is relatively large in size, the current is increased or the torch is moved at a slow speed and in turn when the burr is small in size, the current is reduced or the torch is moved at a fast speed to perform an adjustment, and then this adjustment enables an accommodation for the situation of each of the burrs.

At this time, when the case is formed into a cylindrical shape or an elliptical cylinder shape and the shape of the electrode is of a chisel shape, gas flowing between the case 30 and the electrode at first strikes directly against the front slant surface 22a of the raised section 22 and then it is raised on the slant surface, reaches the top point 22b to cause its pressure to become maximum value, resulting in that a flow speed becomes fast. Then, as it descends along the rear slant surface 22c, the pressure is decreased rapidly to cause its flowing speed to be slow and after this state, the pressure is gradually increased toward the extremity end. Then, an annular large eddy flow is generated toward the point where the pressure is decreased.

The extremity end of the electrode is highly shielded with shield gas by the generated annular eddy flow, and the heat generated at the electrode is absorbed to cause a cooling effect to be increased. At the same time, gas flow flowing to the front slant surface 22a of the top point 22 directly causes a cooling effect to be increased.

As a result, this increased cooling effect enables a value of the arc current to be increased and so even if the moving speed of the electrode is increased, a machining process is not interrupted and a continuous processing can be carried out efficiently. In addition, since the presence of the annular eddy flow may prevent a flowing-in of the surrounding atmosphere to restrict oxidization, it is possible to restrict consumption of oxidization at the electrode.

Further, since the manual operation is carried out, it is possible to accommodate for any type of embodiment even if there are various kinds of shape or size of the processed material and thus the present invention can be widely adapted for the burr processing problem produced at various types of manufacturing factories or iron works and the like.

Preferred Embodiment 1

A cylindrical discharge electrode made of tungsten with a wing-shaped section having a height of 4 mm, a thickness of 3 mm and a lateral width of 20 mm was set to have a height of 0.5 mm, the gas port for the shield gas was covered by the case and the handle made of bakelite was connected to it. Then, as the power supply for the arc welding operation, MICROTEG (manufactured by Kabushiki Kaisha Daihen) was used and a current of 15 A was applied to it. As the shield gas, argon gas was used.

As the processed material, SS400 with a thickness of 2.3 mm was selected and the peripheral edge where the burr was produced was moved at a speed of about 600 mm/min.

As a result, a stable arc discharge was produced, the acute burr was changed uniformly into a smooth surface, i.e. the removing process of the burr was carried out in an entire uniform manner.

Preferred Embodiment 2

A chisel shaped discharge electrode was made of tungsten as its material quality with the extremity end having a height of 8 mm, a lateral width of 8 mm and an acute angle of 60° and with a cylindrical holding part having a diameter of 4 mm and a length of 27 mm. The cylindrical case with an inner diameter of 10 mm and a height of 48 mm was formed by ceramics and a V-shaped guiding groove with a depth of 2 mm was formed at its bottom surface. The handle formed by bakelite was connected to it. Then, as the power supply for the arc welding operation, MICROTEG (manufactured by Kabushiki Kaisha Daihen) was used and currents of 40 A and 50 A were applied. As the shield gas, argon gas was used.

As the processed material, SS400 having a thickness of 2.3 mm was selected and the peripheral edge where the burr was generated was moved at a speed of about 9000 mm/min.

As a result, irrespective of the fact that the moving speed was quite fast, a stable arc discharge was produced, the burr showing an acute angle became a uniform smooth surface and the burr removing processing was carried out in an entire uniform manner. A result of this processing was as indicated in FIGS. 8A, 8B, 8C and 8D.

The conditions of the Embodiment 2, are listed next.

Material: SS400

Operating gas: Ar

Gas pressure: 1.5 Kg$^2$/cm

Stand-off height: 0.5 mm

Cutting speed: 150 mm/s

Plate thickness: 2.3 mm

Nozzle diameter: 11.0 mm

Gas flow: 15.0 l/min

What is claimed is:

1. A burr processing apparatus comprising:
    a chisel-shaped electrical discharge electrode having a cylindrical extremity end with a sectional shape narrowed toward an extremity end and with a specified width in a lateral direction;
    a hold section which is cylindrical or elliptical cylindrical shape in a longitudinal direction;
    a raised part at an intermediate section, said electrical discharge electrode being kept at a height suitable for an arc-discharge;
    a case member covering said entire electrode including said extremity end;
    a handle connected to said case member to be moved manually; and
    a power supply for an arc discharge connected to said discharge electrode.

2. A burr processing apparatus comprising:
    a chisel-shaped electrical discharge electrode having a cylindrical extremity end with a sectional shape narrowed toward an extremity end and with a specified width in a lateral direction;
    a hold section which is cylindrical or elliptical cylindrical shape in a longitudinal direction;
    a raised part at an intermediate section, said electrical discharge electrode being kept at a height suitable for an arc-discharge;
    a case member covering said entire electrode including said extremity end;
    a handle connected to said case member to be moved manually; and
    a power supply for an arc discharge connected to said discharge electrode, wherein a V-shaped guiding groove is formed at the bottom surface of the case.

* * * * *